United States Patent
Long

(10) Patent No.: US 8,719,552 B2
(45) Date of Patent: May 6, 2014

(54) CACHE COLLABORATION METHOD, APPARATUS, AND SYSTEM

(75) Inventor: Youshui Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 13/493,723

(22) Filed: Jun. 11, 2012

(65) Prior Publication Data

US 2012/0243535 A1 Sep. 27, 2012

Related U.S. Application Data

(63) Continuation of application No. PCT/CN2011/074899, filed on May 30, 2011.

(30) Foreign Application Priority Data

Sep. 28, 2010 (CN) .......................... 2010 1 0294827

(51) Int. Cl.
   *G06F 15/00* (2006.01)
(52) U.S. Cl.
   USPC .......................................................... 712/32
(58) Field of Classification Search
   USPC .......................................................... 712/32
   See application file for complete search history.

(56) References Cited

U.S. PATENT DOCUMENTS

| | | | |
|---|---|---|---|
| 6,363,472 B1 * | 3/2002 | Linnermark | 712/36 |
| 7,054,968 B2 * | 5/2006 | Shrader et al. | 710/105 |
| 7,962,582 B2 * | 6/2011 | Potti et al. | 709/220 |
| 2005/0060456 A1 * | 3/2005 | Shrader et al. | 710/240 |
| 2009/0198702 A1 | 8/2009 | Novik et al. | |
| 2009/0234911 A1 | 9/2009 | Khavari | |
| 2012/0163394 A1 * | 6/2012 | Chen et al. | 370/401 |
| 2012/0216212 A1 * | 8/2012 | Flemming et al. | 718/104 |
| 2013/0046953 A1 * | 2/2013 | Iyer et al. | 711/206 |
| 2013/0198489 A1 * | 8/2013 | Branson et al. | 712/200 |

FOREIGN PATENT DOCUMENTS

| | | |
|---|---|---|
| CN | 101645846 A | 2/2010 |
| CN | 101697548 A | 4/2010 |
| CN | 101706755 A | 5/2010 |
| WO | WO 03/088065 A1 | 10/2003 |

OTHER PUBLICATIONS

Written Opinion of the International Searching Authority issued in corresponding PCT Patent Application No. PCT/CN2011/074899, mailed Sep. 8, 2011.

Extended European Search Report issued in corresponding European Patent Application No. 11789182.0, mailed Aug. 24, 2012.

(Continued)

*Primary Examiner* — Fan Ng

(74) *Attorney, Agent, or Firm* — Brinks Gilson & Lione

(57) ABSTRACT

A cache collaboration method includes obtaining, by an upper-layer cache node, bandwidth utilization rates of a backbone port and an edge port of the upper-layer cache node respectively, related information which is about each content obtained by a user in a preset time through the backbone port of the upper-layer cache node, and an access count of the user to each content; comparing, by the upper-layer cache node, the bandwidth utilization rate of the backbone port and the bandwidth utilization rate of the edge port; and when a difference between the bandwidth utilization rate of the backbone port and the bandwidth utilization rate of the edge port is greater than a preset value, sending, by the upper-layer cache node, a collaboration request message to a lower-layer cache node to make the lower-layer cache node adjust a collaboration proportion.

12 Claims, 4 Drawing Sheets

(56) References Cited

OTHER PUBLICATIONS

Ramaswamy et al., "Scalable Delivery of Dynamic Content Using a Cooperative Edge Cache Grid" IEEE Transactions on Knowledge and Data Engineering, vol. 19 No. 5, May 2007.

International Search Report issued in corresponding PCT Patent Application No. PCT/CN2011/074899, mailed Sep. 8, 2011.
Search Report issued in corresponding Chinese Patent Application No. 201010294827X, dated Sep. 10, 2012.

* cited by examiner

CACHE COLLABORATION METHOD, APPARATUS, AND SYSTEM

CROSS-REFERENCE TO RELATED APPLICATIONS

This application is a continuation of International Application No. PCT/CN2011/074899, filed on May 30, 2011, which claims priority to Chinese Patent Application No. 201010294827.X, filed on Sep. 28, 2010, both of which are hereby incorporated by reference in their entireties.

FIELD OF THE APPLICATION

The present application relates to the field of communications technologies, and in particular, to a cache collaboration method, apparatus, and system.

BACKGROUND OF THE APPLICATION

With the popularization of broadband access and the rapid development of streaming media-based broadband applications, the CDN (Content Delivery Network, content delivery network) is found an effective means of effectively mitigating pressure exerted on a backbone network by high throughput of streaming media transmission and improving quality of service of the streaming media. A core idea of the CDN is that a new layer of network architecture is added in the current Internet, and content of a website is published at a network "edge" closest to a user, so that the user may obtain needed content nearby, that is, multiple cache nodes are set in the network, content of one server is evenly distributed to the multiple cache nodes, and the user obtains the content from the closest cache node. In this manner, a problem of a low response speed that occurs when a user visits a website, where the problem is caused by a narrow network bandwidth, heavy traffic of user visits, and uneven distribution of network nodes, is solved, thereby increasing the response speed when a user visits a website.

Storage space of a cache node includes two parts: one part storing the most popular content for access by a local user, and the other part storing content which is involved in collaboration for access by other cache nodes.

If access of the local user does not need to go through a backbone network, but access in the collaboration needs to go through the backbone network, when an output link from a cache node to the backbone network is congested, the collaboration among cache nodes makes the output link from the cache node to the backbone network more congested, thereby reducing a bandwidth utilization rate of the whole network.

SUMMARY OF THE APPLICATION

The embodiments below provide a cache collaboration method, apparatus, and system which are capable of improving a bandwidth utilization rate of a whole network.

The technical solutions according to the embodiments are as follows.

A cache collaboration method, including:

obtaining, by an upper-layer cache node, bandwidth utilization rates of a backbone port and an edge port of the upper-layer cache node respectively, related information which is about each content obtained by a user in a preset time through the backbone port of the upper-layer cache node, and an access count of the user to each content;

comparing, by the upper-layer cache node, the bandwidth utilization rate of the backbone port and the bandwidth utilization rate of the edge port; and when a difference between the bandwidth utilization rate of the backbone port and the bandwidth utilization rate of the edge port is greater than a preset value, sending, by the upper-layer cache node, a collaboration request message to a lower-layer cache node to make the lower-layer cache node adjust a collaboration proportion according to the collaboration request message as well as cache space and cached content of the lower-layer cache node, where the collaboration request message includes bandwidths of the backbone port and the edge port, the bandwidth utilization rates of the backbone port and the edge port, and the related information which is about each content obtained by the user in the preset time through the backbone port of the upper-layer cache node, and the access count of the user to each content.

A cache collaboration apparatus, including:

an obtaining module, configured to obtain bandwidth utilization rates of a backbone port and an edge port, and obtain related information which is about each content obtained by a user in a preset time through the backbone port, and an access count of the user to each content.

a comparing module, configured to compare the bandwidth utilization rate of the backbone port and the bandwidth utilization rate of the edge port;

a sending module, configured to, when a difference between the bandwidth utilization rate of the backbone port and the bandwidth utilization rate of the edge port is greater than a preset value, send a collaboration request message to a lower-layer cache node to make the lower-layer cache node adjust a collaboration proportion according to the collaboration request message as well as cache space and cached content of the lower-layer cache node, where the collaboration request message includes bandwidths of the backbone port and the edge port, the bandwidth utilization rates of the backbone port and the edge port, and the related information which is about each content obtained by the user in the preset time through the backbone port, and the access count of the user to each content.

A cache collaboration system, where the system includes multiple foregoing cache collaboration apparatuses.

According to the cache collaboration method, apparatus, and system in the embodiments, the upper-layer cache node compares the bandwidth utilization rate of the backbone port and the bandwidth utilization rate of the edge port, and when the difference between the bandwidth utilization rate of the backbone port and the bandwidth utilization rate of the edge port is greater than the preset value, the upper-layer cache node sends the collaboration request message to the lower-layer cache node, so as to make the lower-layer cache node adjust the collaboration proportion according to the collaboration request message as well as the cache space and the cached content of the lower-layer cache node. The cache collaboration method, apparatus, and system in the embodiments are capable of reducing a bandwidth utilization rate of a busy link at a high layer and improving a bandwidth utilization rate of an idle link at a low layer, so that bandwidth utilization rates in the whole link become consistent, thereby improving a bandwidth utilization rate of the whole network.

BRIEF DESCRIPTION OF THE DRAWINGS

To illustrate the technical solutions according to embodiments or the prior art more clearly, the accompanying drawings needed for describing the embodiments or the prior art are introduced briefly in the following. Apparently, the accompanying drawings in the following description are merely some embodiments, and persons of ordinary skill in the art may derive other drawings from the accompanying drawings without making creative efforts.

DETAILED DESCRIPTION OF THE EMBODIMENTS

The technical solutions according to the embodiments are clearly and completely described in the following with reference to the accompanying drawings. Apparently, the embodiments described are merely part of rather than all of the embodiments. All other embodiments obtained by persons of ordinary skill in the art based on the embodiments without making creative effects shall fall within the protection scope.

In order to make the advantages of the technical solutions more clear, the embodiments below are described with reference to the accompanying drawings.

Embodiment 1

Figure 1:
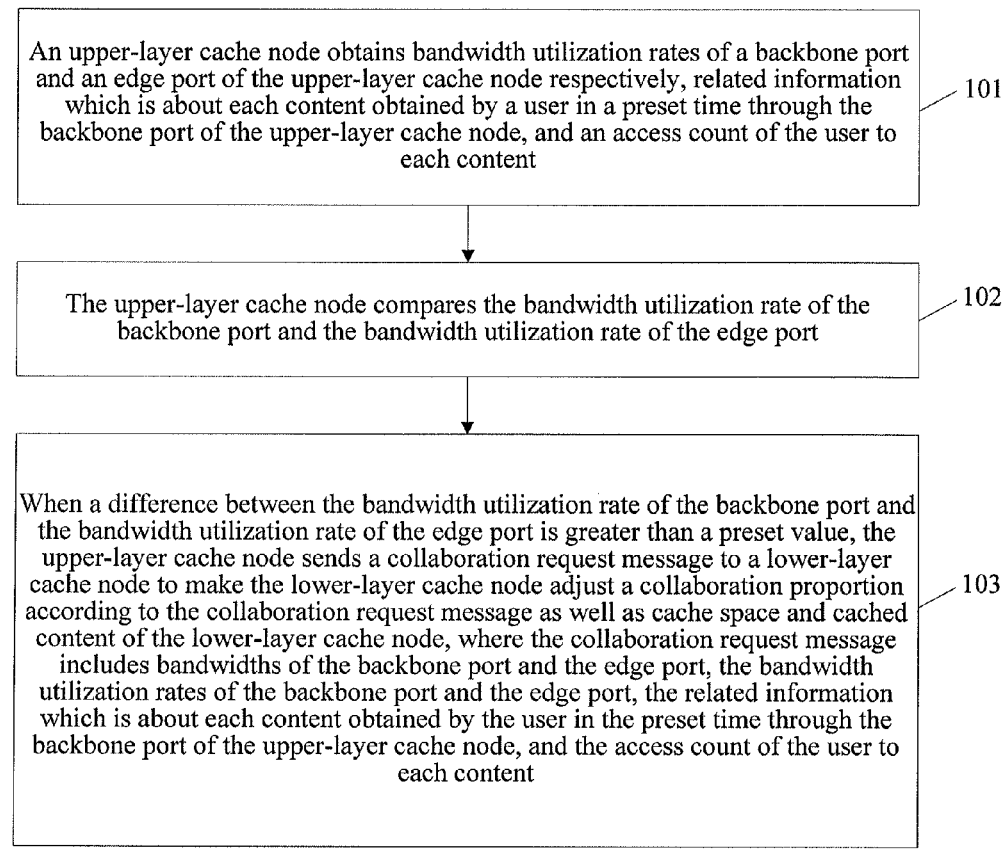
FIG. 1 is a flow chart of a method according to Embodiment 1.

This embodiment provides a cache collaboration method. As shown in FIG. 1, the method includes:

101: An upper-layer cache node obtains bandwidth utilization rates of a backbone port and an edge port of the upper-layer cache node respectively, related information which is about each content obtained by a user in a preset time through the backbone port of the upper-layer cache node, and an access count of the user to each content.

102: The upper-layer cache node compares the bandwidth utilization rate of the backbone port and the bandwidth utilization rate of the edge port.

103: When a difference between the bandwidth utilization rate of the backbone port and the bandwidth utilization rate of the edge port is greater than a preset value, the upper-layer cache node sends a collaboration request message to a lower-layer cache node to make the lower-layer cache node adjust a collaboration proportion according to the collaboration request message as well as cache space and cached content of the lower-layer cache node, where the collaboration request message includes bandwidths of the backbone port and the edge port, the bandwidth utilization rates of the backbone port and the edge port, the related information which is about each content obtained by the user in the preset time through the backbone port of the upper-layer cache node, and the access count of the user to each content.

According to the cache collaboration method in the embodiment, the upper-layer cache node compares the bandwidth utilization rate of the backbone port and the bandwidth utilization rate of the edge port, and when the difference between the bandwidth utilization rate of the backbone port and the bandwidth utilization rate of the edge port is greater than the preset value, the upper-layer cache node sends the collaboration request message to the lower-layer cache node, so as to make the lower-layer cache node adjust the collaboration proportion according to the collaboration request message as well as the cache space and the cached content of the lower-layer cache node. The cache collaboration method in the embodiment is capable of reducing a bandwidth utilization rate of a busy link at a high layer and improving a bandwidth utilization rate of an idle link at a low layer, so that bandwidth utilization rates in the whole link become consistent, thereby improving a bandwidth utilization rate of a whole network.

Embodiment 2

This embodiment provides a cache collaboration method. In this embodiment, an upper-layer cache node of a cache node A is a cache node B, and a lower-layer node is a cache node C.

Figure 2A:
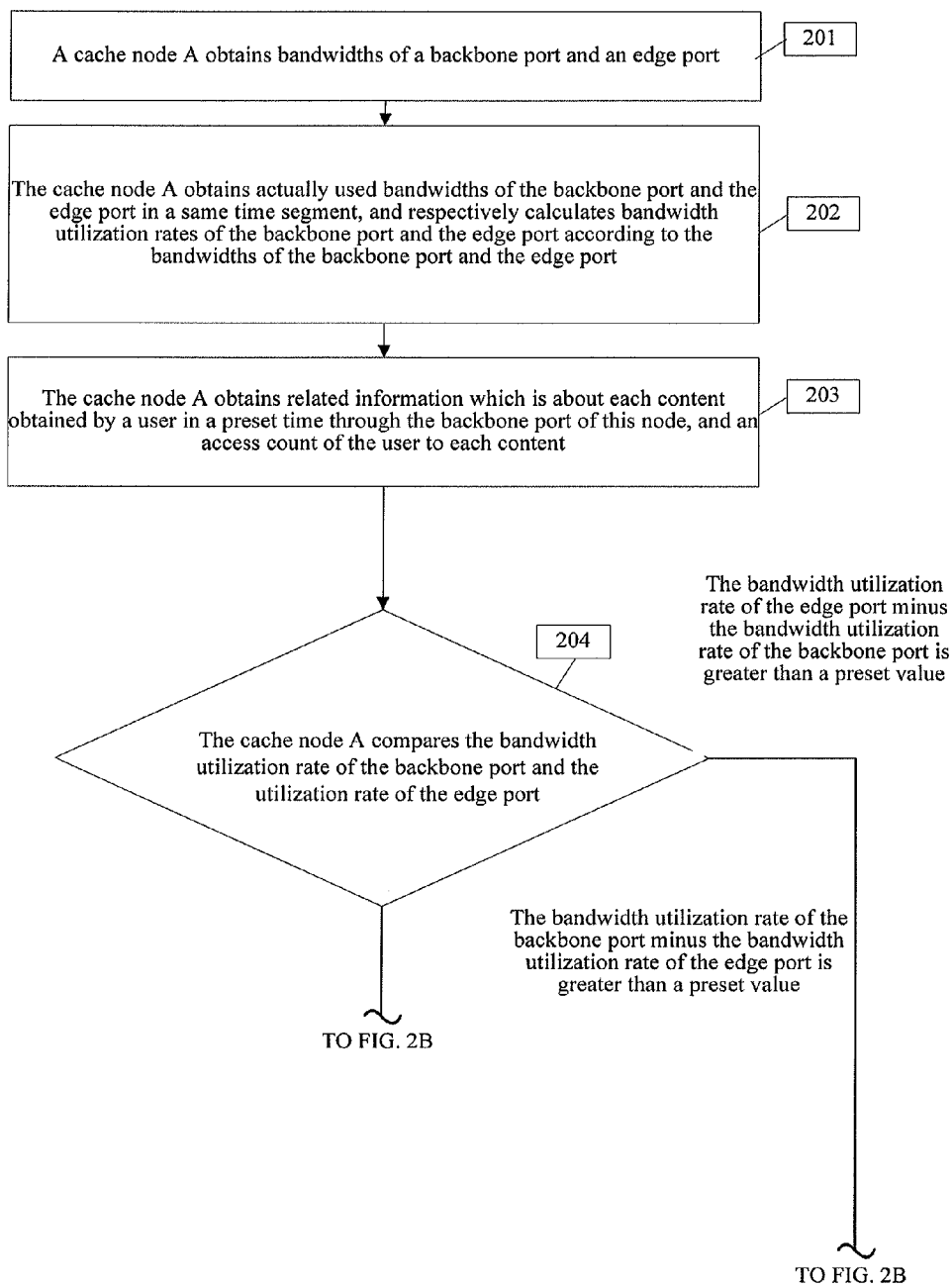
FIGS. 2A and 2B is a flow chart of a method according to Embodiment 2.
Figure 2B:
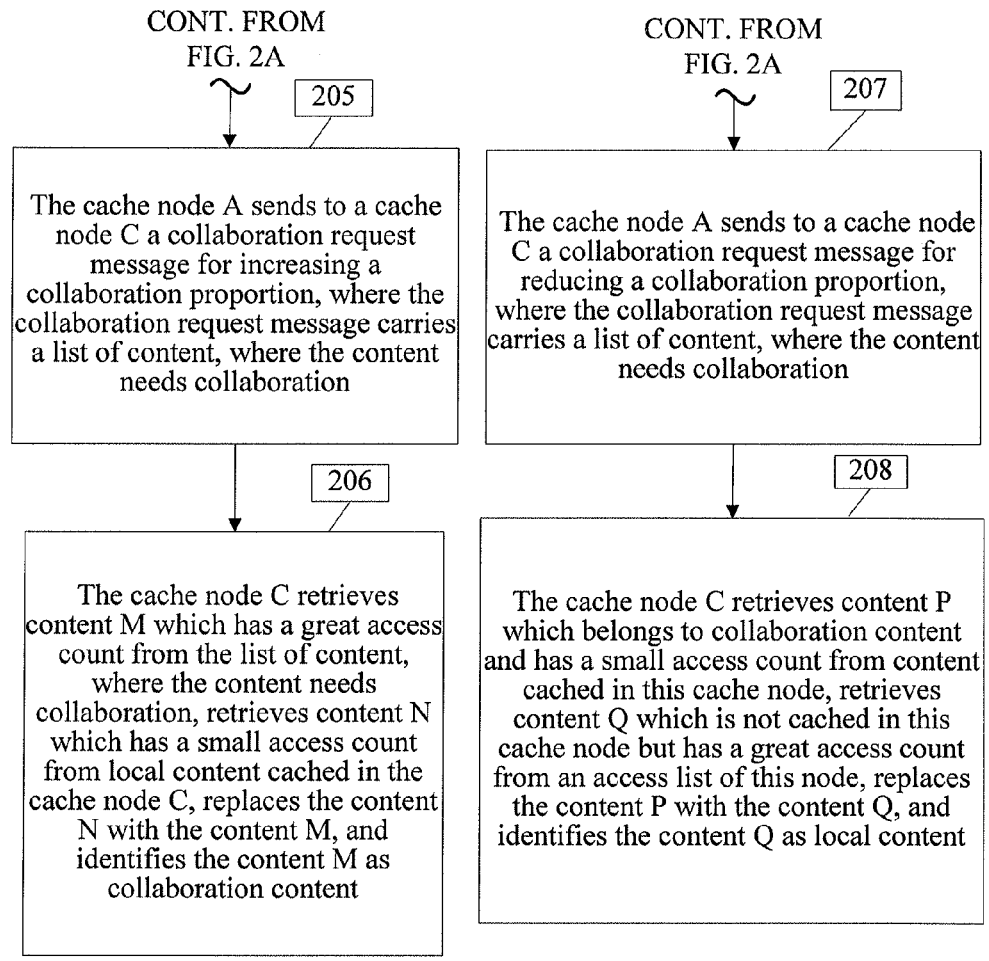

As shown in FIG. 2, the cache collaboration method includes:

201: A cache node A obtains a bandwidth of each of its service port, where the service port include a backbone port and an edge port, the backbone port is connected to a cache node B, and the edge port is connected to a cache node C; relatively speaking, the backbone port is a port close to a backbone network and the edge port is a port close to a user.

202: In a peak hour of network traffic, the cache node A monitors traffic changes of the backbone port and the edge port respectively and obtains actually used bandwidths of the backbone port and the edge port in a same time segment, and respectively calculates bandwidth utilization rates of the backbone port and the edge port according to bandwidths of the backbone port and the edge port.

A bandwidth utilization rate of a backbone port=an actually used bandwidth of the backbone port/a bandwidth of the backbone port.

A bandwidth utilization rate of an edge port=an actually used bandwidth of the edge port/a bandwidth of the edge port.

203: The cache node A obtains related information which is about each content obtained by the user in a preset time through the backbone port of this node, and an access count of the user to each content.

The cache node A usually only stores content with the greatest access count; therefore, among the content which the user accesses on the cache node A, a part of the content is stored in the cache node A and may be obtained on the cache node A directly. The rest part of the content is not stored in the cache node A, and needs to be obtained by accessing the upper-layer cache node B through the backbone port of the cache node A. The cache node A records the access count to each content obtained by the user in the preset time on this node respectively, and related information which is about each content obtained by the user on the cache node B through the backbone port of this node, and an access count of the user to each content, where the related information may include a name of content, a size, and a bit rate of content, which is not limited here.

204: The cache node A compares the bandwidth utilization rate of the backbone port and the bandwidth utilization rate of the edge port, and when a difference between the bandwidth utilization rate of the backbone port and the bandwidth utilization rate of the edge port is greater than a preset value, the upper-layer cache node sends a collaboration request message to a lower-layer cache node to make the lower-layer cache node adjust a collaboration proportion according to the collaboration request message as well as cache space and cached content of the lower-layer cache node, where the collaboration request message includes the bandwidths of the backbone port and the edge port, the bandwidth utilization rates of the backbone port and the edge port, the related information which is about each content obtained by the user in the preset time through the backbone port of the upper-layer cache node, and the access count of the user to each content.

Specifically, when the bandwidth utilization rate of the backbone port minus the bandwidth utilization rate of the edge port is greater than the preset value, 205 to 206 are performed; and when the bandwidth utilization rate of the edge port minus the bandwidth utilization rate of the backbone port is greater than the preset value, 207 to 208 are performed.

The preset value can be set according to an actual condition, for example, 10%, which is not limited here.

205: The cache node A sends to the cache node C a collaboration request message for increasing the collaboration proportion.

The collaboration request message carries the bandwidths of the backbone port and the edge port, the bandwidth utilization rates of the backbone port and the edge port, and a list of content, where the content needs collaboration, where the list of content, where the content needs collaboration, includes related information which is about each content obtained by the user on the upper-layer cache node B through the backbone port of this node, and the access count of the user to each content, where the related information may include a name of content, a size, and a bit rate of content, which is not limited here.

206: After receiving the collaboration request message which is for increasing the collaboration proportion and is sent by the cache node A, the cache node C, according to the bandwidths of the backbone port and the edge port, the bandwidth utilization rates of the backbone port and the edge port, and the list of content, where the content needs collaboration, in combination with the cache space and the cached content of the cache node C, replaces local content cached in the cache node C with content in the list of content, where the content needs collaboration.

Specifically, the cache node C retrieves content M which has a great access count from the list of content, where the content needs collaboration, retrieves content N which has a small access count from local content cached in the cache node C, replaces the content N with the content M, and identifies the content M as collaboration content.

For the cache node C, an available bandwidth of the backbone port after the content replacement=an available bandwidth of the original backbone port+a bit rate of the content M×an access count to the content M.

An available bandwidth of the edge port after the content replacement=an available bandwidth of the edge port−a bit rate of the content N×a local access count to the content N.

207: The cache node A sends to the cache node C a collaboration request message for reducing the collaboration proportion.

The collaboration request message carries the bandwidths of the backbone port and the edge port, the bandwidth utilization rates of the backbone port and the edge port, and a list of content, where the content needs collaboration, where the list of content, where the content needs collaboration, includes related information which is about each content obtained by the user from the upper-layer cache node B through the backbone port of this node, and the access count of the user to each content, where the related information may include a name of content, a size, and a bit rate of content, which is not limited here.

208: After receiving the collaboration request message which is for reducing the collaboration proportion and is sent by the cache node A, the cache node C, according to the bandwidths of the backbone port and the edge port, the bandwidth utilization rates of the backbone port and the edge port, and the list of content, where the content needs collaboration, in combination with the cache space and the cached content of the cache node C, replaces content which has a small access count among collaboration content cached in the cache node C with content which is obtained through the backbone port of the cache node C and has a great access count.

Specifically, the cache node C retrieves content P which belongs to the collaboration content and has a small access count from the content cached in this cache node, retrieves content Q which is not cached in this cache node but has a great access count from an access list of this node, replaces the content P with the content Q, and identifies the content Q as local content.

For the cache node C, an available bandwidth of the backbone port after the content replacement=an available bandwidth of the original backbone port−a bit rate of the content P×an access count to the content P.

An available bandwidth of the edge port after the content replacement=an available bandwidth of the edge port+a bit rate of the content Q×a local access count to the content Q.

According to the cache collaboration method in the embodiment, the upper-layer cache node compares the bandwidth utilization rate of the backbone port and the bandwidth utilization rate of the edge port, and when the difference between the bandwidth utilization rate of the backbone port and the bandwidth utilization rate of the edge port is greater than the preset value, the upper-layer cache node sends the collaboration request message to the lower-layer cache node, so that the lower-layer cache node, according to the collaboration request message as well as the cache space and the cached content of the lower-layer cache node, replaces the content which has a small access count among local content cached in the lower-layer cache node with the content which has a great access count among each content, or replaces the content which has a small access count among the collaboration content cached in the lower-layer cache node with the content which is obtained through the backbone port of the lower-layer cache node and has a great access count. The cache collaboration method according to the embodiment is capable of reducing a bandwidth utilization rate of a busy link at a high layer and improving a bandwidth utilization rate of an idle link at a low layer, so that bandwidth utilization rates in the whole link become consistent, thereby improving a bandwidth utilization rate of the whole network.

Embodiment 3

Figure 3:
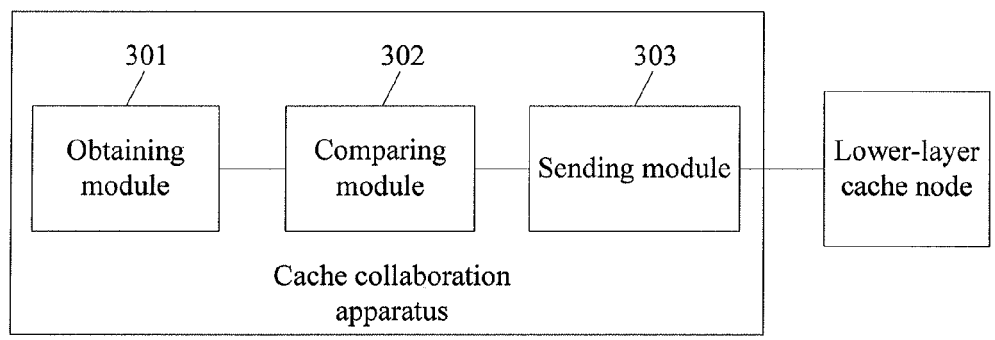
FIG. 3 and FIG. 4 are schematic structural diagrams of an apparatus according to Embodiment 3.

This embodiment provides a cache collaboration apparatus. When the apparatus is used as an upper-layer cache node, as shown in FIG. 3, the apparatus includes:

an obtaining module 301, configured to obtain bandwidth utilization rates of a backbone port and an edge port, related information which is about each content obtained by a user in a preset time through the backbone port, and an access count of the user to each content;

a comparing module 302, configured to compare the bandwidth utilization rate of the backbone port and the bandwidth utilization rate of the edge port; and a sending module 303, configured to, when a difference between the bandwidth utilization rate of the backbone port and the bandwidth utilization rate of the edge port is greater than a preset value, send a collaboration request message to a lower-layer cache node to make the lower-layer cache node adjust a collaboration proportion according to the collaboration request message as well as cache space and cached content of the lower-layer cache node, where the collaboration request message includes bandwidths of the backbone port and the edge port, the bandwidth utilization rates of the backbone port and the edge port, the related information which is about each content obtained by the user in the preset time through the backbone port, and the access count of the user to each content.

Figure 4:
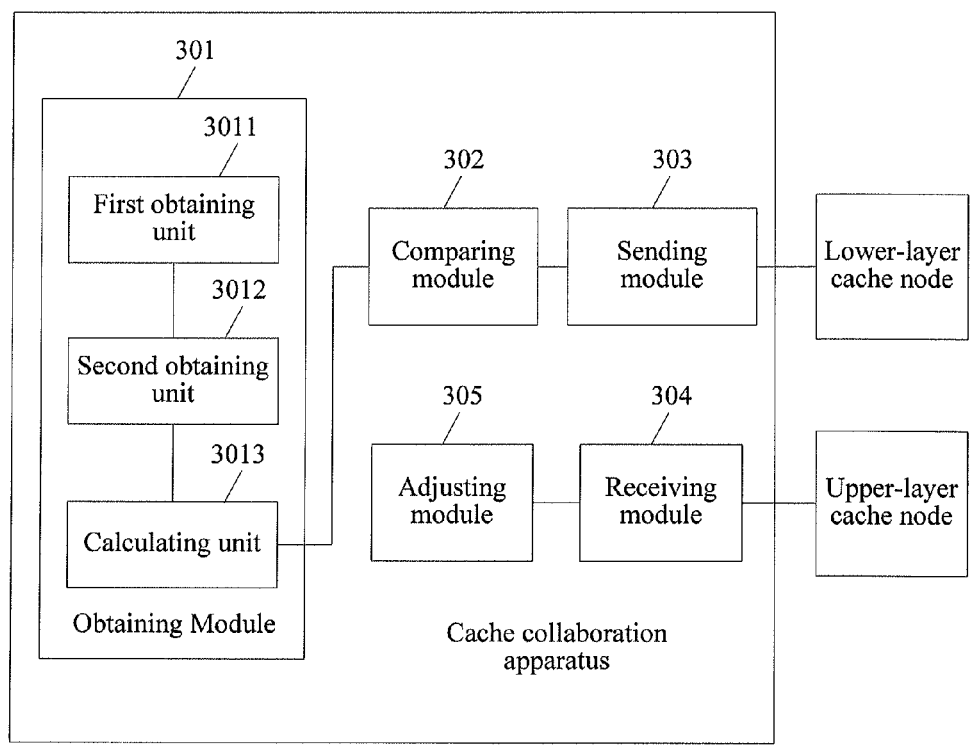

Further, as shown in FIG. 4, the obtaining module 301 may include:

a first obtaining unit 3011, configured to obtain the bandwidths of the backbone port and the edge port;

a second obtaining unit 3012, configured to obtain actually used bandwidths of the backbone port and the edge port in a same time segment; and a calculating unit 3013, configured to, according to the bandwidths and actually used bandwidths of the backbone port and the edge port, calculate the bandwidth utilization rates of the backbone port and the edge port respectively, where the bandwidth utilization rate of the backbone port is obtained by dividing the actually used bandwidth of the backbone port by the bandwidth of the backbone port, and the bandwidth utilization rate of the edge port is obtained by dividing the actually used bandwidth of the edge port by the bandwidth of the edge port.

Further, when the apparatus is used as the upper-layer cache node, the sending module 303 is specifically configured to, when a difference obtained by subtracting the bandwidth utilization rate of the edge port from the bandwidth utilization rate of the backbone port is greater than the preset value, send to the lower-layer cache node a collaboration request message for increasing the collaboration proportion, so that the lower-layer cache node, according to the bandwidths of the backbone port and the edge port, the bandwidth utilization rates of the backbone port and the edge port, the related information which is about each content obtained by the user in the preset time through the backbone port of the apparatus, and the access count of the user to each content, as well as the cache space and the cached content of the lower-layer cache node, replaces content which has a small access count among local content cached in the lower-layer cache node with content which has a great access count among each content.

Further, when the apparatus is used as the upper-layer cache node, the sending module 303 is configured to, when a difference obtained by subtracting the bandwidth utilization rate of the backbone port from the bandwidth utilization rate of the edge port is greater than the preset value, send to the lower-layer cache node a collaboration request message for reducing the collaboration proportion, so that the lower-layer cache node, according to the bandwidths of the backbone port and the edge port, the bandwidth utilization rates of the backbone port and the edge port, the related information which is about each content obtained by the user in the preset time through the backbone port of the apparatus, and the access count of the user to each content, as well as the cache space and the cached content of the lower-layer cache node, replaces content which has a small access count among collaboration content cached in the lower-layer cache node with content which is obtained through the backbone port of the lower-layer cache node and has a great access count.

Further, as shown in FIG. 4, when the apparatus is used as a lower-layer cache node, the apparatus may further include:

a receiving module 304, configured to receive a collaboration request message sent by an upper-layer cache node, where the collaboration request message includes the bandwidths of the backbone port and the edge port, the bandwidth utilization rates of the backbone port and the edge port, the related information which is about each content obtained by the user in the preset time through the backbone port of the apparatus, and the access count of the user to each content; and an adjusting module 305, configured to adjust the collaboration proportion according to the collaboration request message as well as cache space and cached content of the apparatus.

Further, the receiving module 304 is specifically configured to receive a collaboration request message which is for increasing the collaboration proportion and is sent by the upper-layer cache node.

The adjusting module 305 is specifically configured to, according to the bandwidths of the backbone port and the edge port, the bandwidth utilization rates of the backbone port and the edge port, the related information which is about each content obtained by the user in the preset time through the backbone port of the upper-layer cache node, and the access count of the user to each content, as well as the cache space and the cached content of the apparatus, replace content which has a small access count among cached local content with content which has a great access count among each content.

Further, the receiving module 304 is specifically configured to receive a collaboration request message which is for reducing the collaboration proportion is sent by the upper-layer cache node.

The adjusting module 305 is specifically configured to, according to the bandwidths of the backbone port and the edge port, the bandwidth utilization rates of the backbone port and the edge port, the related information which is about each content obtained by the user in the preset time through the backbone port of the upper-layer cache node, and the access count of the user to each content, as well as the cache space and the cached content of the apparatus, replace content which has a small access count among cached collaboration content with content which is obtained through the backbone port and has a great access count.

According to the cache collaboration apparatus in the embodiment, the upper-layer cache node compares the bandwidth utilization rate of the backbone port and the bandwidth utilization rate of the edge port, and when the difference between the bandwidth utilization rate of the backbone port and the bandwidth utilization rate of the edge port is greater than the preset value, the upper-layer cache node sends the collaboration request message to the lower-layer cache node, so that the lower-layer cache node, according to the collaboration request message as well as the cache space and the cached content of the lower-layer cache node, replaces content which has a small access count among local content cached in the lower-layer cache node with content which has a great access count among each content, or replaces content which has a small access count among the collaboration content cached in the lower-layer cache node with content which is obtained through the backbone port of the lower-layer cache node and has a great access count. The cache collaboration apparatus according to the embodiment is capable of reducing a bandwidth utilization rate of a busy link at a high layer and improving a bandwidth utilization rate of an idle link at a low layer, so that bandwidth utilization rates in the whole link become consistent, thereby improving a bandwidth utilization rate of a whole network.

An embodiment further provides a cache collaboration system. The system includes multiple foregoing cache collaboration apparatuses, where the multiple cache collaboration apparatuses are cascaded, a cache collaboration apparatus at the highest level is connected to a backbone network, and a cache collaboration apparatus at the lowest level is connected to a user. For two adjacent cache collaboration apparatuses, a cache collaboration apparatus close to the backbone network is an upper-layer cache node, and a cache collaboration apparatus close to the user is a lower-layer cache node.

In all of the embodiments, the cache node is a logical function node with a storage function, which may be a network device with a built-in storage service unit, or may be formed by a network device and an external storage server.

The cache collaboration apparatus and system provided in the embodiments may implement the foregoing provided method embodiments. The cache collaboration method, apparatus, and system provided in the embodiments may be applicable to cache collaboration among multiple cache nodes, which is not limited here.

Persons of ordinary skill in the art may understand that all or part of the processes of the method according to the foregoing embodiments may be implemented by a computer program instructing relevant hardware. The program may be stored in a computer readable storage medium. When the program is run, the processes of the foregoing methods according to the embodiments are performed. The storage medium may be a magnetic disk, a compact disk, a read-only memory (Read-Only Memory, ROM) or a random access memory (Random Access Memory, RAM), and so on.

The foregoing descriptions are merely exemplary embodiments, but are not intended to limit the protection scope of the claims. Any modification or replacement that may be easily thought out by persons skilled in the art within the described technical scope are understood to fall within the protection scope of the claims.

What is claimed is:

1. A cache collaboration method, comprising:
   obtaining, by an upper-layer cache node, bandwidth utilization rates of a backbone port and an edge port of the upper-layer cache node, respectively, and related information which defines each piece of content obtained by a user in a preset time through the backbone port of the upper-layer cache node, and an access count of the user to each content;
   comparing, by the upper-layer cache node, the bandwidth utilization rate of the backbone port and the bandwidth utilization rate of the edge port; and
   when a difference between the bandwidth utilization rate of the backbone port and the bandwidth utilization rate of the edge port is greater than a preset value, sending, by the upper-layer cache node, a collaboration request message to a lower-layer cache node to make the lower-layer cache node adjust a collaboration proportion according to the collaboration request message as well as cache space and cached content of the lower-layer cache node, wherein the collaboration request message comprises bandwidths of the backbone port and the edge port, the bandwidth utilization rates of the backbone port and the edge port, the related information which defines each piece of content obtained by the user in the preset time through the backbone port of the upper-layer cache node, and the access count of the user to each content.

2. The method according to claim 1, wherein obtaining, by the upper-layer cache node, the bandwidth utilization rates of the backbone port and the edge port of the upper-layer cache node respectively, comprises:
   obtaining the bandwidths of the backbone port and the edge port of the upper-layer cache node;
   obtaining actually used bandwidths of the backbone port and the edge port in a same time segment; and
   calculating the bandwidth utilization rates of the backbone port and the edge port, respectively, according to the bandwidths and actually used bandwidths of the backbone port and the edge port, wherein the bandwidth utilization rate of the backbone port is obtained by dividing the actually used bandwidth of the backbone port by the bandwidth of the backbone port, and the bandwidth utilization rate of the edge port is obtained by dividing the actually used bandwidth of the edge port by the bandwidth of the edge port.

3. The method according to claim 1, wherein sending, by the upper-layer cache node, when a difference between the bandwidth utilization rate of the backbone port and the bandwidth utilization rate of the edge port is greater than a preset value, a collaboration request message to a lower-layer cache node to make the lower-layer cache node adjust a collaboration proportion according to the collaboration request message as well as cache space and cached content of the lower-layer cache node comprises:
   when a difference obtained by subtracting the bandwidth utilization rate of the edge port from the bandwidth utilization rate of the backbone port is greater than the preset value, sending, by the upper-layer cache node to the lower-layer cache node, a collaboration request message for increasing the collaboration proportion, so that the lower-layer cache node replaces content which has a small access count among local content cached in the lower-layer cache node with content which has a great access count among each content, wherein the lower-layer cache node replaces the content according to the bandwidths of the backbone port and the edge port, the bandwidth utilization rates of the backbone port and the edge port, the related information which defines each piece of content obtained by the user in the preset time through the backbone port of the upper-layer cache node, the access count of the user to each content, and the cache space and the cached content of the lower-layer cache node.

4. The method according to claim 1, wherein sending, by the upper-layer cache node, when a difference between the bandwidth utilization rate of the backbone port and the bandwidth utilization rate of the edge port is greater than a preset value, a collaboration request message to a lower-layer cache node to make the lower-layer cache node adjust a collaboration proportion according to the collaboration request message as well as cache space and cached content of the lower-layer cache node comprises:
   when a difference obtained by subtracting the bandwidth utilization rate of the backbone port from the bandwidth utilization rate of the edge port is greater than the preset value, sending, by the upper-layer cache node to the lower-layer cache node, a collaboration request message for reducing the collaboration proportion, so that the lower-layer cache node replaces content which has a small access count among collaboration content cached in the lower-layer cache node with content which is obtained through the backbone port of the lower-layer cache node and has a great access count, wherein the lower-layer cache node replaces the content according to the bandwidths of the backbone port and the edge port, the bandwidth utilization rates of the backbone port and the edge port, the related information which defines each piece of content obtained by the user in the preset time through the backbone port of the upper-layer cache node, the access count of the user to each content, as well as the cache space and the cached content of the lower-layer cache node.

5. A cache collaboration apparatus, comprising:
   an obtaining module configured to obtain bandwidth utilization rates of a backbone port and an edge port, and related information which defines each piece of content obtained by a user in a preset time through the backbone port, and an access count of the user to each content;

a comparing module configured to compare the bandwidth utilization rate of the backbone port and the bandwidth utilization rate of the edge port;

a sending module configured to, when a difference between the bandwidth utilization rate of the backbone port and the bandwidth utilization rate of the edge port is greater than a preset value, send a collaboration request message to a lower-layer cache node to make the lower-layer cache node adjust a collaboration proportion according to the collaboration request message as well as cache space and cached content of the lower-layer cache node, wherein the collaboration request message comprises bandwidths of the backbone port and the edge port, the bandwidth utilization rates of the backbone port and the edge port, the related information which defines each piece of content obtained by the user in the preset time through the backbone port, and the access count of the user to each content.

6. The apparatus according to claim 5, wherein the obtaining module comprises:

a first obtaining unit configured to obtain the bandwidths of the backbone port and the edge port;

a second obtaining unit configured to obtain actually used bandwidths of the backbone port and the edge port in a same time segment; and a calculating unit configured to, according to the bandwidths and actually used bandwidths of the backbone port and the edge port, calculate the bandwidth utilization rates of the backbone port and the edge port respectively, wherein the bandwidth utilization rate of the backbone port is obtained by dividing the actually used bandwidth of the backbone port by the bandwidth of the backbone port, and the bandwidth utilization rate of the edge port is obtained by dividing the actually used bandwidth of the edge port by the bandwidth of the edge port.

7. The apparatus according to claim 5, wherein the sending module is further configured to, when a difference obtained by subtracting the bandwidth utilization rate of the edge port from the bandwidth utilization rate of the backbone port is greater than the preset value, send to the lower-layer cache node a collaboration request message for increasing the collaboration proportion, so that the lower-layer cache node replaces content which has a small access count among local content cached in the lower-layer cache node with content which has a great access count among each content, wherein the lower-layer cache node replaces the content according to the bandwidths of the backbone port and the edge port, the bandwidth utilization rates of the backbone port and the edge port, the related information which is about each content obtained by the user in the preset time through the backbone port, the access count of the user to each content, as well as the cache space and the cached content of the lower-layer cache node.

8. The apparatus according to claim 5, wherein the sending module is further configured to, when a difference obtained by subtracting the bandwidth utilization rate of the backbone port from the bandwidth utilization rate of the edge port is greater than the preset value, send to the lower-layer cache node a collaboration request message for reducing the collaboration proportion, so that the lower-layer cache node replaces content which has a small access count among collaboration content cached in the lower-layer cache node with content which is obtained through the backbone port of the lower-layer cache node and has a great access count, wherein the lower-layer cache node replaces the content according to the bandwidths of the backbone port and the edge port, the bandwidth utilization rates of the backbone port and the edge port, the related information which is about each content obtained by the user in the preset time through the backbone port, the access count of the user to each content, as well as the cache space and the cached content of the lower-layer cache node.

9. The apparatus according to claim 5, further comprising:

a receiving module configured to receive the collaboration request message sent by the upper-layer cache node, wherein the collaboration request message comprises the bandwidths of the backbone port and the edge port, the bandwidth utilization rates of the backbone port and the edge port, the related information which defines each piece of content obtained by the user in the preset time through the backbone port of the upper-layer cache node, and the access count of the user to each content; and an adjusting module configured to adjust the collaboration proportion according to the collaboration request message as well as cache space and cached content of the apparatus.

10. The apparatus according to claim 9, wherein the receiving module is further configured to receive a collaboration request message for increasing the collaboration proportion and is sent by the upper-layer cache node; and the adjusting module is further configured to replace content which has a small access count among cached local content with content which has a great access count among each content according to the bandwidths of the backbone port and the edge port, the bandwidth utilization rates of the backbone port and the edge port, the related information which is about each content obtained by the user in the preset time through the backbone port of the upper-layer cache node, the access count of the user to each content, as well as the cache space and the cached content of the apparatus.

11. The apparatus according to claim 9, wherein the receiving module is further configured to receive a collaboration request message for reducing the collaboration proportion and is sent by the upper-layer cache node; and the adjusting module is further configured to replace content which has a small access count among cached collaboration content with content which is obtained through the backbone port and has a great access count according to the bandwidths of the backbone port and the edge port, the bandwidth utilization rates of the backbone port and the edge port, the related information which is about each content obtained by the user in the preset time through the backbone port of the upper-layer cache node, the access count of the user to each content, as well as the cache space and the cached content of the apparatus.

12. A cache collaboration system, comprising multiple cache collaboration apparatuses according to claim 5.

* * * * *